United States Patent [19]

Grossmann et al.

[11] Patent Number: 5,293,118
[45] Date of Patent: Mar. 8, 1994

[54] DEVICE FOR MEASURING THICKNESS OF SHEET ARTICLE WITH MAGNET AND PROBE CARRIERS PROVIDED WITH ROLLERS

[75] Inventors: Guido Grossmann, Munich; Hans-Joachim Reuter, Neufahrn; Werner Nitsche, Munich, all of Fed. Rep. of Germany

[73] Assignee: Agfa-Gevaert AG, Leverkusen, Fed. Rep. of Germany

[21] Appl. No.: 823,105

[22] Filed: Jan. 16, 1992

[30] Foreign Application Priority Data

Feb. 14, 1991 [DE] Fed. Rep. of Germany ....... 4104460

[51] Int. Cl.$^5$ .............. G01B 7/10; G01R 33/12; B65H 7/02
[52] U.S. Cl. ................... 324/229; 324/226; 271/265
[58] Field of Search ............. 324/229, 230, 231, 235, 324/226, 262; 73/159; 33/501.02, 501.03; 271/264, 265, 263, 273, 274; 221/2, 4

[56] References Cited

U.S. PATENT DOCUMENTS

| | | | |
|---|---|---|---|
| 2,537,731 | 1/1951 | Angell | 324/229 |
| 3,182,301 | 5/1965 | Kolb | 324/231 |
| 3,213,542 | 10/1965 | Murtland | 324/231 |
| 4,426,784 | 1/1984 | Loftus et al. | 33/501.02 |
| 4,909,499 | 3/1990 | O'Brien et al. | 271/263 |

Primary Examiner—Walter E. Snow
Attorney, Agent, or Firm—Michael J. Striker

[57] ABSTRACT

An arrangement for measuring a thickness of a sheet article during a sheet article transportation, especially for measuring the thickness of an X-ray sheet film in an X-ray cassette loading and unloading device, has a magnet carrier arranged in a spring-biased manner on a sheet article transportation path perpendicularly to one side of the transportation path, a permanent magnet arranged on the magnet carrier near the first side of the magnet transportation path, at least one roller body arranged on the magnet carrier rotatably in a transportation direction of the sheet aarticle, a probe carrier fixedly arranged parallel to a second side of the transportation path opposite to the matnet carrier, a Hall probe arranged on the probe carrier opposite to the permanent magnet, at least one roller body arranged on the probe carrier. The probe carrier has a number of the roller bodies which corresponds to a number of the roller bodies on the magnet carrier. The roller bodies of the magnet carrier and the probe carrier rolling over one another in a plane of the transportation path. A control unit evaluates an output signal of the Hall probe.

12 Claims, 3 Drawing Sheets

DEVICE FOR MEASURING THICKNESS OF SHEET ARTICLE WITH MAGNET AND PROBE CARRIERS PROVIDED WITH ROLLERS

BACKGROUND OF THE INVENTION

The present invention relates to a device for measuring a thickness of sheet articles.

In device for transporting sheet articles, especially X-ray sheet film loading and unloading devices, a sheet article is moved along a transportation path by a suitable transporting roller pair. In X-ray sheet film loading and unloading devices, the X-ray sheet film is removed from the magazine, transferred to a transporting roller pair, and transported from it to a further transporting roller pair and so on until the X-ray sheet film is transported to a cassette to be loaded and placed in it. The transporting rollers can be formed as complete rollers or as roller pieces mounted on a shaft. An X-ray sheet film cassette must be loaded during this process only with an X-ray sheet film. It is however necessary to detect double and multiple films so as to prevent their transportation. In order to solve this problem of the detection of the double and multiple films several devices are proposed in the prior art.

One of the possibilities is the utilization of infrared light barriers. The presumption for this method is that the light permeability reduces when two or more X-ray sheet films lie over one another. When in a constant time interval the passing light quantity is integrated, a value is produced which is dependent on the number of the X-ray sheet films located in the region of the through light barrier. This arrangement however cannot be used for infrared-sensitive X-ray sheet film or X-ray sheet film with high transparency. German document DE-OS 3,800,249 discloses an X-ray sheet film loading and unloading device, in which a transporting roller of one transporting roller pair is turnably supported on a lever arm about a lever point. The second lever arm which is located opposite the lever arm with the transporting roller is arranged under a spring force, so that the rollers of the transporting roller pair are pressed against one another. When an X-ray sheet film is drawn from this transporting roller pair, the transporting roller supported on the lever is turned depending on the number of the drawn film sheets. The second lever arm is also turned in correspondence with the lever condition and actuates a microswitch when more than one X-ray sheet film is drawn by the transporting roller pair. This means that it can be no difference whether one or no X-ray sheet film is drawn by the transporting rollers. The arrangement for measuring the X-ray sheet film thickness disclosed in this document also has a further disadvantage in that it is mechanically very expensive, since a transporting roller must be supported turnably and it is very tolerance sensitive, with respect to the roller diameter, roller elasticity, lever size, position of the opening for the lever and roller support, etc. In addition, there is a danger that the once adjusted arrangement can lose the adjustment due to the transporting movement and the vibrations during certain times. Thereby, no reliable detection of the multiple sheets or films can be guaranteed over a long time.

SUMMARY OF THE INVENTION

Accordingly, it is an object of the present invention to provide an arrangement for measuring the thickness of a sheet film which avoids the disadvantages of the prior art.

More particularly, it is an object of the present invention to provide an arrangement of the above mentioned general type which is automatically adjustable, has a very low movable mass, and detects the number of sheets pulled by a transporting roller pair.

In keeping with these objects and with others which will become apparent hereinafter, one feature of the present invention resides, briefly stated, in an arrangement for measuring the thickness of a sheet article which has a magnet carrier arranged in spring-biased manner on an X-ray sheet film transportation path perpendicularly to a first side of the transportation path, a permanent magnet arranged on the magnet carrier near the first side of the transportation path, the magnet carrier has at least one roller body rotatable in a transportation direction of the X-ray sheet film, a probe carrier is fixedly arranged parallel to a second side of a transportation path and opposite to the magnet carrier, a Hall probe is arranged opposite to the permanent magnet on the probe carrier, and the probe carrier has the same number of the rolling bodies as the magnet carrier.

When the arrangement is designed in accordance with the present invention it avoids the disadvantages of the prior art and provides for the above specified advantages.

Due to the compact construction of the arrangement there are only lower requirements with respect to the rigidity of the frame of the loading and unloading device, and therefore in an advantageous manner the measurements can be performed in the center of the X-ray sheet film transporation paths.

A further advantage of the inventive arrangement is that after the single mechanical course adjustment, the fine adjustment is performed automatically by means of a control device. Therefore the temperature influence and mechanical influence such as drawing of the frame, are compensated. In addition there is the advantage that by the control device different thickness is processed and a natural number is outputted by the control device which corresponds to the number of the X-ray sheet films drawn by the transporting roller pair.

In accordance with another feature of the present invention the magnet carrier is arranged in a fixed housing, the magnet carrier is connected with the housing by means of a helical spring, and the helical spring supplies the force perpendicularly to the X-ray sheet film transportation path upon the magnet carrier, whereby the roller bodies of the magnet carrier and the Hall probe carrier are pressed against one another.

Still another feature of the present invention is that the roller bodies can be formed as steel rollers. The rollers bodies can be formed as ball bearings.

Still another feature of the present invention is that the permanent magnet with its south pole is arranged perpendicularly to the transportation path.

Finally another feature of the present invention is that the arrangement has a control device which evaluates a Hall voltage so that the arrangement is automatically adjustable.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 2:
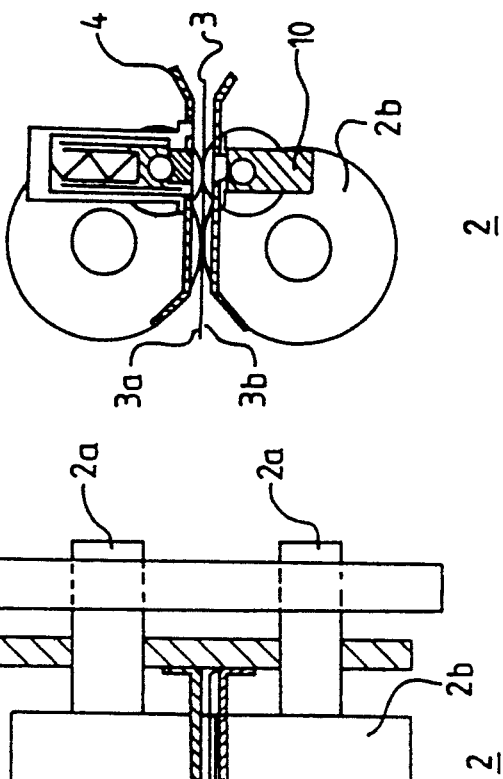
FIG. 2 is a view showing a section of the inventive arrangement along the line I—I.
Figure 1:
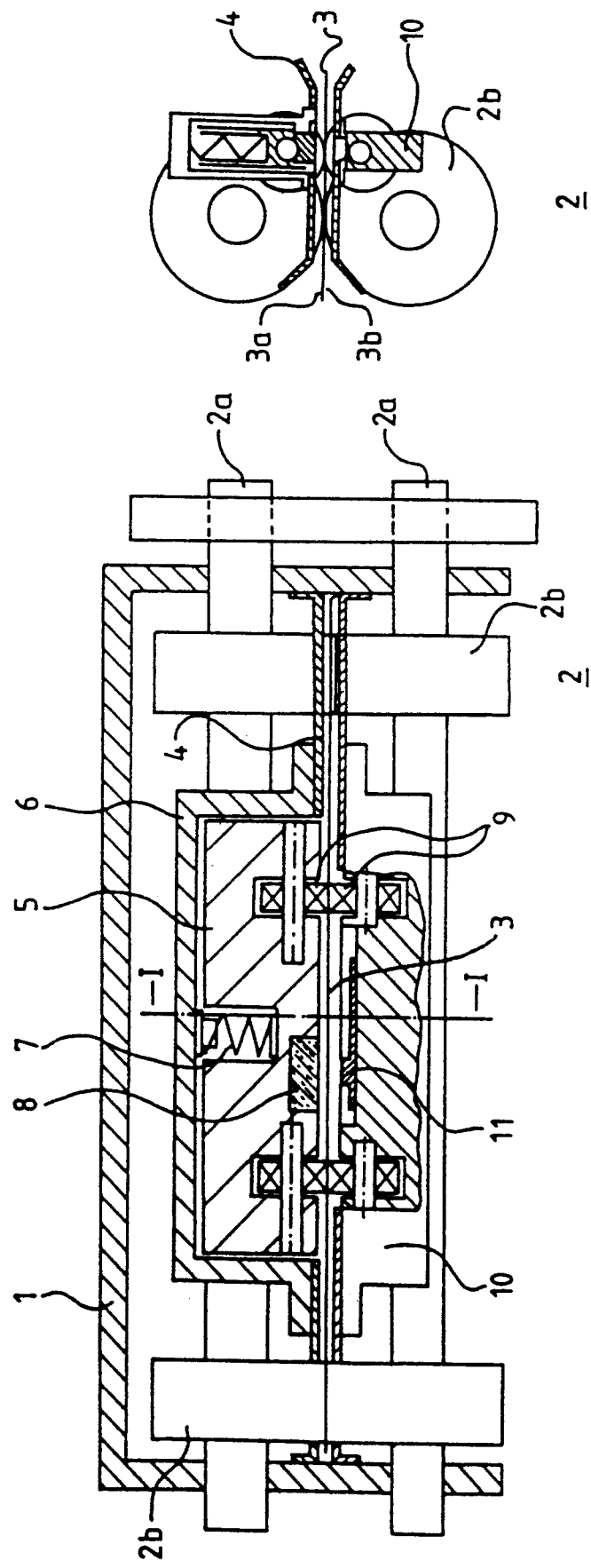
FIG. 1 is a view showing an example of a transporting roller pair of an X-ray cassette loading and unloading device with an arrangement in accordance with the present invention.

In FIG. 1 a frame of a loading and unloading device for X-ray sheet film cassettes is not shown in detail, is identified with reference numeral 1. As schematically shown the transporting roller pair is identified with reference numeral 2 and includes two parallel shafts 2a, and roller pieces 2b which are mounted so that they roll over one another.

The point in which the roller pieces 2b contact one another is located on a straight line which in turn is located in a transportation surface. The transportation surface of path is identified with reference numeral 3. The X-ray sheet film is transported in an X-ray sheet film cassette loading and unloading device along the transportation path 3. Transportation path 3 is formed by a plurality of the transporting roller pairs 3 as well as correspondingly shaped guiding sheets 4. Only one roller pair 2 and a guiding sheet device is shown.

A first side of the transportation path 3 is identified with reference 3a while its second side is idenfitied with reference 3b. A magnet carrier 5 is arranged in the center of the transportation path 3 perpendicularly to the first side 3a. The magnet carrier 5 is supported in a fixed housing 6 in a spring-biased manner. The spring biased support includes a helical spring 7 which is fixedly mounted with its one end on a wall of the housing 6, which wall extends parallel to the transportation path 3. The second end of the helical spring 7 is connected with the magnet carrier 5. Its spring force acts so that it passes the magnet carrier 5 perpendicularly in direction to the first side 3a of the transportation path 3. A permanent magnet 8 is arranged in a sunk fashion at the side of the magnet carrier 5 which faces the first side 3a of the transportation path 3. The permanent magnet 8 extends with its south pole perpendicularly to the first side 3a. Furthermore, the magnet carrier 5 has at least one roller body 9 which extends tangentially to the upper surface of the transportation path 3 and is rotatable in the direction of transportation.

A probe carrier 10 is fixedly arranged in the housing 6, opposite to the spring-biased magnet support 5 and perpendicularly to the first side 3b of the transportation path 3. The probe carrier 10 also has the roller bodies 9, similarly to the magnet carrier 5. The roller bodies 9 of the magnet and probe carrier contact one another in the transportation path 3 and roll over one another in a transportation direction. Furthermore, a Hall probe 11 is arranged on the probe carrier 10. It is located opposite to the permanent magnet 8 and faces the second side 3b of the transportation path 3.

The magnet carrier 8 and the probe carrier 10 are arranged relative to one another so that their roller bodies 9 extend through a guiding plate pair 4. The roller bodies can be formed as steel or synthetic plastic rollers, as balls or as ball bearings.

Figure 3:
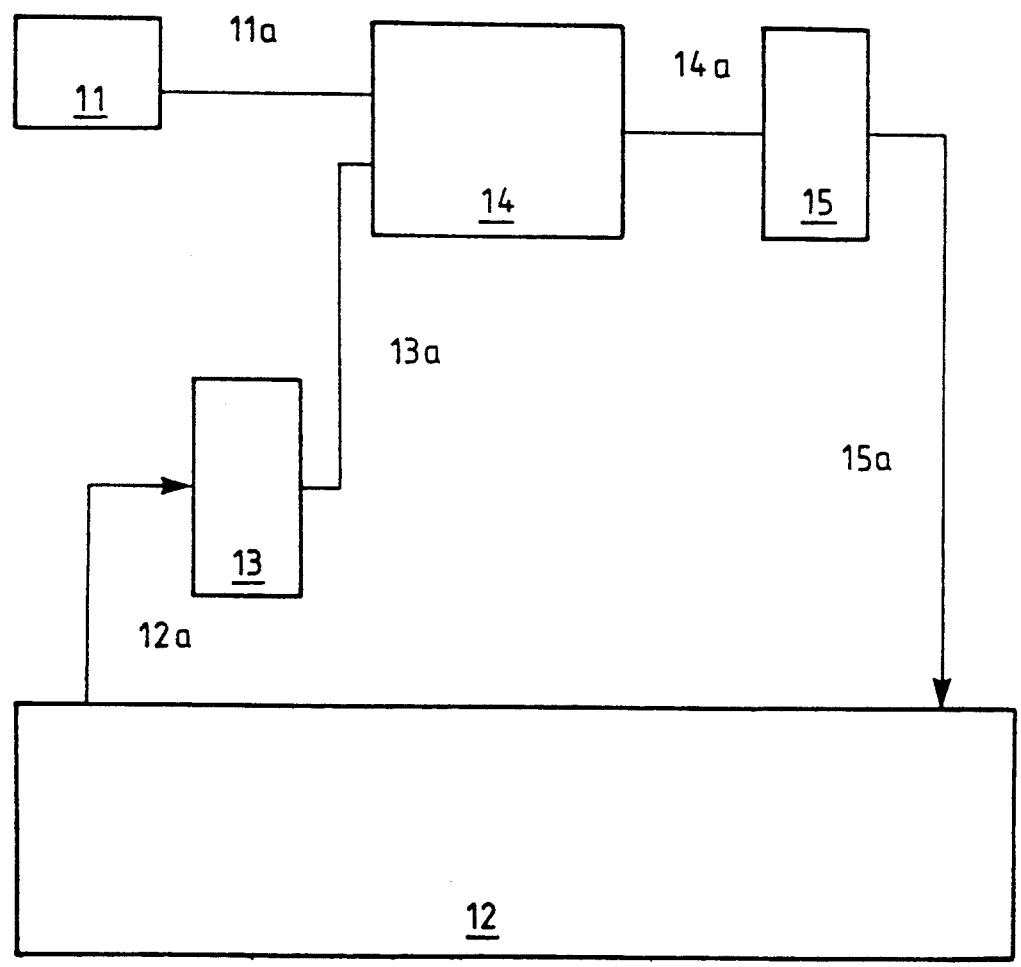
FIG. 3 is a block diagram of an evaluating circuit for an output signal of the whole probe.

A control unit is identified in FIG. 3 with reference numeral 12. By means of the control unit 12 and with a D/A converter 13 a reference voltage 13a is adjustable. The reference voltage 13a is produced from a Hall voltage 11a of the Hall probe 11 with a subtractor 14. A difference voltage 14a between the Hall voltage and the reference voltage is converted by means of an A/D converter 15 to a corresponding digital value 15a. The digital value 15a is detected by the control unit 12.

Figure 4:
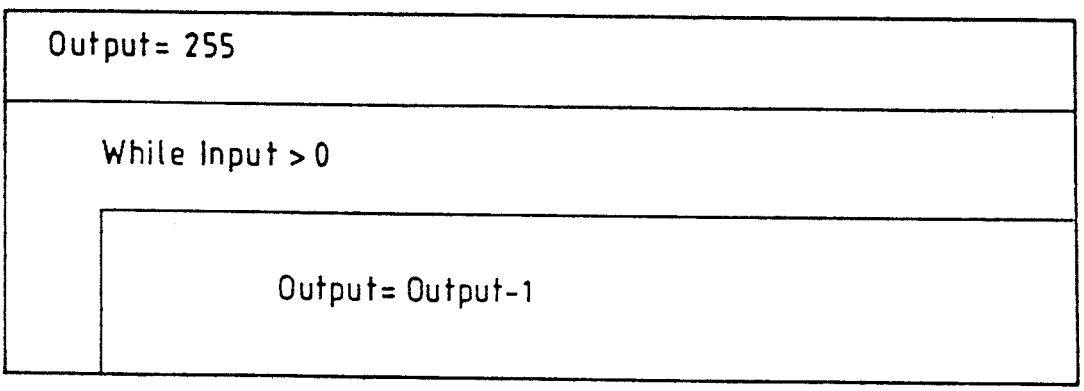
FIG. 4 is a view illustrating an adjusting process of the arrangement by means of a control device, illustrated by a flow diagram.
Figure 5:
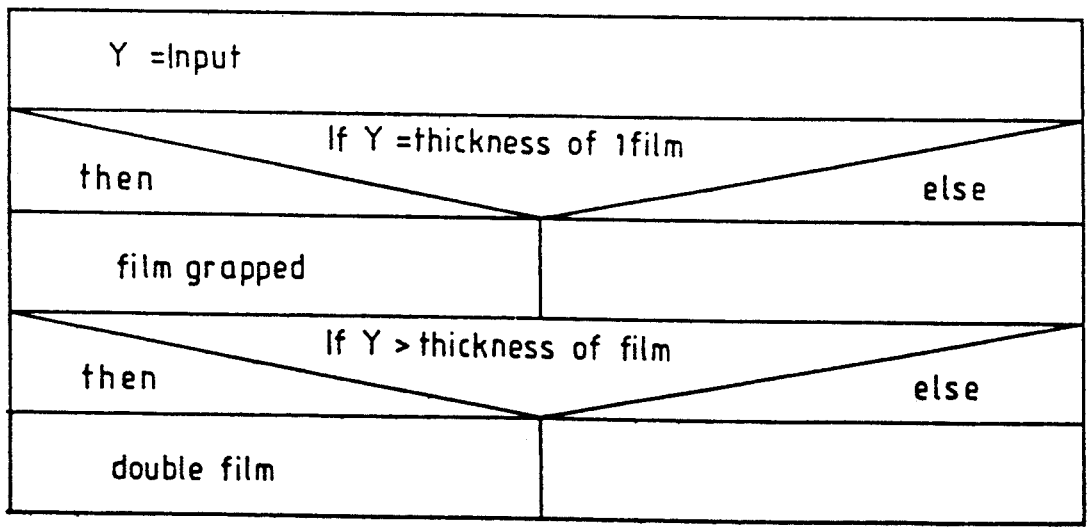
FIG. 5 is a view showing a processing of the output signal of the Hall probe by means of the control device, shown in a flow diagram.

FIGS. 3 and 4 illustrate the processing for evaluation of the Hall probe signal in flow diagrams. The operation of the inventive arrangement is performed as follows:

After mounting of the arrangement in the X-ray sheet film loading and unloading device, it is coarsely adjusted so that the roller bodies 9 contact one another in the transportation path 3 so that they are rotatable in the transportation direction. The magnet carrier 5 must be freely movable in its housing 6, and therefore an X-ray sheet film movable along the transportation path 3 can press the the roller bodies against the force of the spring 7 away from one another. The position of the magnets 8 relative to the Hall probe 11 is therefore coarsely preadjusted.

After turning on of the X-ray sheet film cassette loading and unloading device, the control unit 12 determines the condition of the device. If the condition is such that no X-ray sheet film is engaged by the transporting rollers 2, the control unit 12 performs a fine adjustment of the inventive arrangement. For this purpose the control unit 12 sets an input 12a to the binary value corresponding to the number 255. The value provided at the output 12a controls a D/A converter 13 which converts this value into a reference voltage 13a. By means of a subtractor 14, the reference voltage 13a is subtracted from the Hall voltage 11a of the Hall probe 11. Therefore a difference voltage is provided at the output of the subtractor 14. It is converted by an A/D converter 15 to a digital value 15a.

The control unit 12 changes its output 12a in a stepped manner until the digital value 15a is equal to zero. The control unit 12 therefore has completed the fine adjustment of the inventive arrangement. This process can be performed by the control unit always when the device condition shows that no X-ray sheet film is engaged by the transporting rollers. Thereby all mechanical and electrical influences upon the measurement result are compensated and the reliability of the measurement during the service life of the device is guaranteed regardless of the failure of its components.

When now the loading and unloading device transports and X-ray sheet film, it stops the transportation when the X-ray sheet film is located between the rolling bodies 9. The X-ray sheet film presses away the magnet carrier 5 against the force of the spring 7 from the probe carrier 10. Therefore the distance between the magnet carrier 5 and the probe carrier 10 changes, and this leads to a change of the Hall voltage 11a. Since the reference voltage 13a is compared with the Hall voltage 11a which is adjusted when no X-ray sheet film is available between the roller bodies 9, the change of the Hall voltage 11a leads to a change of the difference voltage 14a. The change of the difference voltage 14a is converted by the A/D converter 15 to a digital value 15a, then it is detected by the control unit 12, and placed in a data storage with an address Y. The control unit 12 compares the value stored in Y with a comparison value which corresponds to the thickness of an X-ray sheet film. This comparison value must be measured during a first start of the device. The measurements can be performed also for X-ray sheet film of different thickness, so that the loading and unloading device can process different film types, since these values are storeable in the control unit 12.

When the value Y is equal to the comparison value, the transporting roller pair 2, as desired, draws an X-ray sheet film. When the value Y is greater than the comparison value, the control unit 12 records a double film and controls the loading and unloading device in suitable manner. It is however possible to measure and to store tabels per each film type which makes possible exact information about the number of the X-ray sheet films drawn in by the transporting roller pair 2 in dependence on the film type.

It will be understood that each of the elements described above, or two or more together, may also find a useful application in other types of constructions differing from the types described above.

While the invention has been illustrated and described as embodied in a device for measuring the thickness of sheet articles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An arrangement for measuring a thickness of an X-ray sheet film in an X-ray cassette loading and unloading device during an X-ray sheet film transportation, the arrangement comprising a magnet carrier arranged at one side of a sheet article transportation path and spring-biased in a direction perpendicularly to the transportation path so as to be displaceable in said direction; a permanent magnet fixedly mounted on said magnet carrier near said first side of said magnet transportation path; at least one roller body arranged on said magnet carrier rotatably in a transportation direction of the sheet article and so as to be displaceable in said direction together with said magnet carrier; a probe carrier fixedly arranged parallel to a second side of the transportation path opposite to said magnet carrier; a Hall probe arranged on said probe carrier opposite to said permanent magnet at another side of the transportation path so that said magnet is displaceable perpendicularly to the transportation path and relative to said Hall probe, depending on a thickness of a transported sheet article; at least one roller body arranged on said probe carrier, said probe carrier having a number of said roller bodies which corresponds to a number of said roller bodies on said magnet carrier, said roller bodies of said magnet carrier and said probe carrier being roller-shaped and rolling over one another in the transportation direction and in a plane of the transportation path which extends through the arrangement in one plane; and control means for evaluating an output signal of said Hall probe so as to determine whether a single sheet film or a double sheet film is transported and to control the transportation correspondingly.

2. An arrangement as defined in claim 1; and further comprising a fixed housing, said magnet carrier being arranged in said fixed housing; and a helical spring by which said magnet carrier is connected with said housing; said helical spring applying a force to said magnet carrier perpendicularly to said transportation path, said roller bodies of said magnet carrier and said probe carrier pressing against one another.

3. An arrangement as defined in claim 1, wherein said roller bodies are formed as steel rollers.

4. An arrangement as defined in claim 1, wherein said roller bodies are formed as ball bearings.

5. An arrangement as defined in claim 1, wherein said permanent magnet has a south pole perpendicular to said transportation path.

6. An arrangement as defined in claim 1, wherein said control means is operative for evaluation of a Hall voltage of said Hall probe so that the arrangement is self-adjustable.

7. An arrangement for measuring a thickness of an X-ray sheet film in an X-ray cassette loading and unloading device, the arrangement comprising a magnet carrier arranged at one side of the sheet article transportation path and spring-biased in a direction perpendicularly to the transportation path so as to be displaceable in said direction; a permanent magnet fixedly mounted on said magnet carrier near said first side of said magnet transportation path; at least one roller body arranged on said magnet carrier rotatably in a transportation direction of the sheet article and so as to be displaceable in said direction together with said magnet carrier; a probe carrier fixedly arranged parallel to a second side of the transportation path opposite to said magnet carrier; a Hall probe arranged on said probe carrier opposite to said permanent magnet at another side of the transportation path so that said magnet is displaceable perpendicularly to the transportation path and relative to said Hall probe, depending on a thickness of a transported sheet article; at least one roller body arranged on said probe carrier, said probe carrier having a number of said roller bodies which corresponds to a number of said roller bodies on a said magnet carrier, said roller bodies of said magnet carrier and said probe carrier being roller-shaped and rolling over one another in the transportation direction and in a plane of the transportation path which extends through the arrangement in one plane, said roller bodies of said magnet carrier including two roller bodies and said roller bodies of said probe carrier also including two roller bodies so as to form two paris of said roller bodies and control means for evaluating an output signal of said Hall probe so as to determine whether a single sheet film or a double sheet film is transported and to control the transportation correspondingly.

8. An arrangement as defined in claim 7; and further comprising spring means which spring-biases said magnet carrier in a direction perpendicularly to the transportation path, said paris of said roller bodies being spaced from one another in the transportation direction, said permanent magnet, said Hall probe, and said spring means being located between said pairs of said roller bodies in a transportation direction.

9. An arrangement as defined in claim 7, wherein said roller bodies have axes of rotation extending parallel to said transportation path.

10. An arrangement for loading and unloading X-ray sheet film cassettes, comprising means for transporting an X-ray sheet film to and from a cassette along a transportation path; and means for preventing a double sheet film transportation, said preventing means including a magnet carrier arranged at one side of the sheet article transportation path and spring-biased in a direction perpendicularly to the transportation path so as to be displaceable in said direction, a permanent magnet fixedly mounted on said magnet carrier near said first side of said magnet transportation path, at least one roller body arranged on said magnet carrier rotatably in a transportation direction of the sheet article and so as to be displaceable in said direction together with said magnet carrier, a probe carrier fixedly arranged parallel to a second side of the transportation path opposite to said magnet carrier, a Hall probe arranged on said probe carrier opposite to said permanent magnet at another side of the transportation path so that said magnet is displaceable perpendicularly to the transportation path and relative to said Hall probe, depending on a thickness of a transported sheet article, at least one roller body arranged on said probe carrier, said probe carrier having a number of said roller bodies which corresponds to a number of said roller bodies on said magnet carrier, said roller bodies of said magnet carrier and said probe carrier being roller-shaped and rolling over one another in the transportation direction and in a plane of the transportation path which extends through the arrangement in one plane, and control means for evaluating an output signal of said Hall probe so as to determine whether a single sheet film or a double sheet film is transported by said transporting means and to control said transporting means correspondingly in accordance with said determination.

11. An arrangement as defined in claim 10, wherein said number of said roller bodies on said magnet carrier includes two roller bodies, and said number of said roller bodies of said probe carrier also includes two roller bodies so as to form two paris of said roller bodies, said pairs of said roller bodies being spaced from one another in the transportation direction, said permanent magnet and said Hall probe being located between said two pairs of said roller bodies in the transportation direction; and further comprising spring means which biases said magnet carrier in a direction perpendicularly to the transportation path and which is also located between said roller pairs in the transportation direction.

12. An arrangement as defined in claim 10, wherein said transporting means includes rotatable transporting elements, said rotatable transporting elements and said roller bodies being rotatable about axes of rotation extending parallel to said transportation path.

* * * * *